(No Model.)

L. GIBBS.
LAWN RAKE.

No. 489,672. Patented Jan. 10, 1893.

Witnesses
E. J. Lane
Chas. R. Miller

Inventor
Lewis Gibbs
By W. R. Miller
Attorney

UNITED STATES PATENT OFFICE.

LEWIS GIBBS, OF CANTON, OHIO.

LAWN-RAKE.

SPECIFICATION forming part of Letters Patent No. 489,672, dated January 10, 1893.

Application filed June 20, 1892. Serial No. 437,264. (No model.)

*To all whom it may concern:*

Be it known that I, LEWIS GIBBS, a citizen of the United States, and a resident of Canton, county of Stark, State of Ohio, have invented a new and useful Improvement in Lawn-Rakes, of which the following is a full, clear, and exact description, reference being had to the accompanying drawings, making part of this specification.

My invention relates to improvements in lawn rakes and consists in certain features of construction and combination of parts as will be hereinafter described and pointed out in the claims, by which a light, strong and durable rake is produced at a greatly reduced initial cost.

Figure 1:
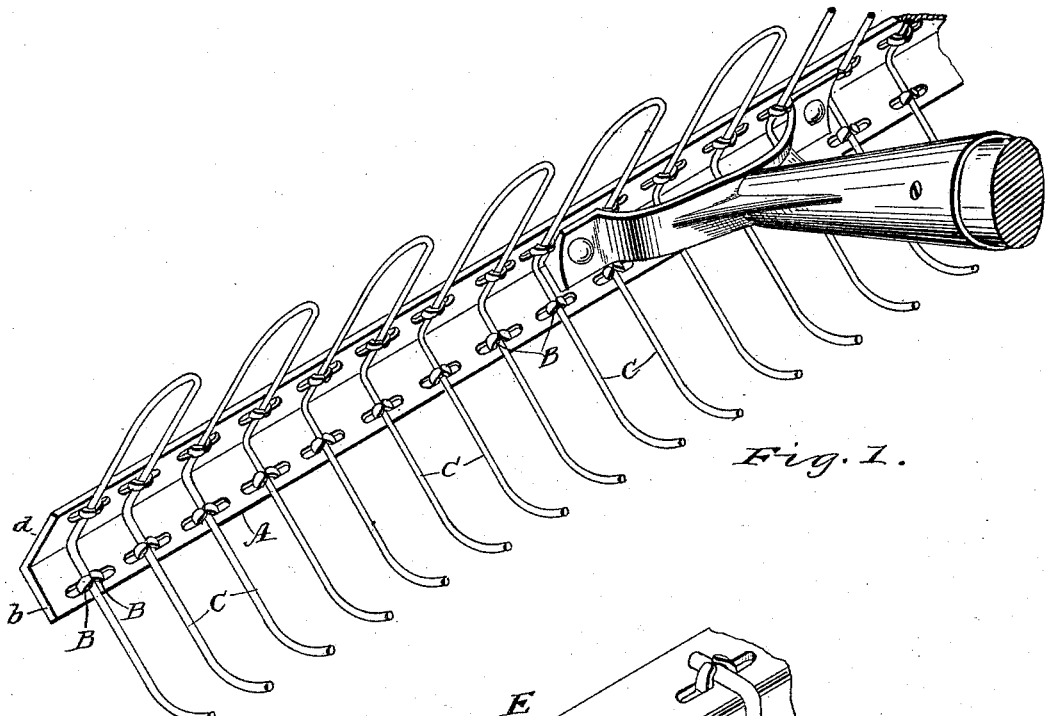
Figure 2:
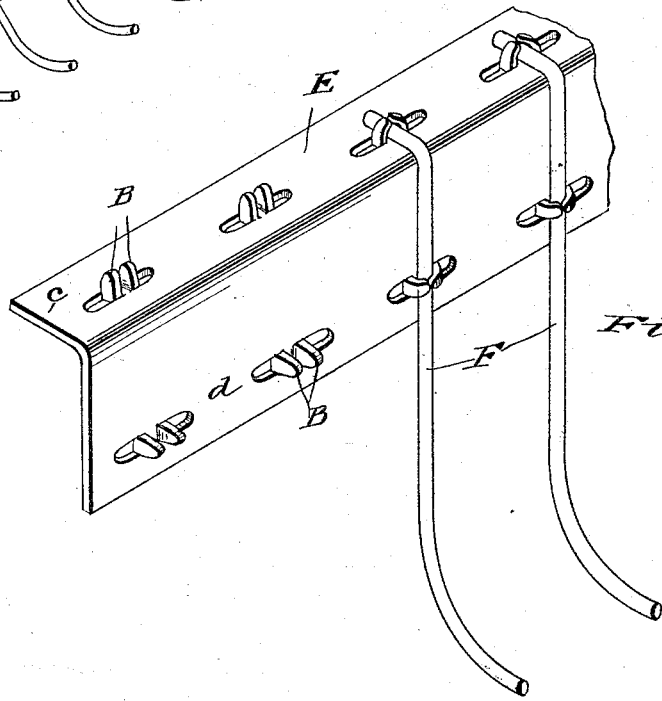

Figure 1 of the accompanying drawings is a view in perspective of a lawn rake illustrating my invention. Fig. 2 is a similar view of a modified form.

Referring to Fig. 1, A represents the rake head which is preferably made of angle steel bars rolled to a thickness of about No. 14 wire, the flanges $a$, $b$, formed to an angle of about ninety degrees. In the so formed flanges $a$ $b$ tongues or fingers B, are cut out of the body of said flanges, the free ends of which are pressed to stand out on the inside of the angle. The bar is cut into desired lengths and teeth C of the form shown that is a U shaped tooth bent to conform to the inside of the angle bar, and to project transverse the head to form a rake and a hood as shown. To secure a handle to the rake head, a handle socket D, is provided having prongs E, the outer end portions of which are formed on an angle to correspond with the angle of the head to which they are secured.

In Fig. 2 is shown a modified form of head, or another adaptation of my invention, only differing in the form of the angle bar from which the head is made and the form of the tooth. In this figure, the flanges $c$ and $d$ of the angle bar E are formed at right angles and of different width, the front flange $c$ wider than the top flange $d$ to form a better support for the teeth F.

The leading feature of the invention consists in the angle flanged head having tongues or fingers cut therefrom the free ends of which are bent down over to embrace and secure the teeth to the head. After which the head with the teeth so secured are dipped into a vat of molten tin by which the tongues and teeth are soldered together.

Having thus fully described the nature and object of my invention, what I claim and desire to secure by Letters Patent is:

1. The combination in a lawn rake of the angle flanged head having cut therefrom, in pairs and attached thereto at one end, a series of tongues, the free ends of which are adapted to be turned over a series of teeth, and thereby secure the teeth to the head, substantially as described.

2. The combination in a lawn rake of an angle flanged head, having cut therefrom in pairs, a series of tongues, the free ends of which are bent to embrace a series of U shaped teeth, extending on opposite sides of the head inclined transversely, substantially as described.

In testimony whereof I have hereunto set my hand this 15th day of June, A. D. 1892.

LEWIS GIBBS.

Witnesses:
 W. K. MILLER,
 CHAS. R. MILLER.